(12) United States Patent
Suzuki et al.

(10) Patent No.: US 8,869,368 B2
(45) Date of Patent: Oct. 28, 2014

(54) METHOD OF REMOVING A CARTRIDGE

(75) Inventors: Takeshi Suzuki, Shinagawa-ku (JP);
Toshimitsu Kawasaki, Shinagawa-ku (JP)

(73) Assignee: NEC Embedded Products, Ltd., Tokyo (JP)

( * ) Notice: Subject to any disclaimer, the term of this patent is extended or adjusted under 35 U.S.C. 154(b) by 932 days.

(21) Appl. No.: 13/056,018

(22) PCT Filed: Aug. 21, 2009

(86) PCT No.: PCT/JP2009/064646
§ 371 (c)(1),
(2), (4) Date: Jan. 26, 2011

(87) PCT Pub. No.: WO2010/038561
PCT Pub. Date: Apr. 8, 2010

(65) Prior Publication Data
US 2011/0131782 A1    Jun. 9, 2011

(30) Foreign Application Priority Data
Sep. 30, 2008    (JP) ................. 2008-252795

(51) Int. Cl.
*B23P 19/00* (2006.01)
*G11B 15/68* (2006.01)
*G11B 17/22* (2006.01)

(52) U.S. Cl.
CPC ........ *G11B 15/6835* (2013.01); *G11B 15/6885* (2013.01); *G11B 17/225* (2013.01)
USPC ..................... 29/426.5; 369/30.43

(58) Field of Classification Search
USPC ........... 29/426.5, 426.6; 360/92.1; 369/30.38, 369/30.4, 30.42, 30.43, 30.45
See application file for complete search history.

(56) References Cited

U.S. PATENT DOCUMENTS 5,532,888 A * 7/1996 Acosta et al. ................ 360/92.1
5,647,717 A   7/1997 Yokogawa et al.
(Continued)

FOREIGN PATENT DOCUMENTS

DE    102005002786 A1    10/2005
DE    102005057678 A1    6/2007
(Continued)

OTHER PUBLICATIONS

Japanese Office Action, dated May 7, 2013, issued by the Japanese Patent Office in counterpart Japanese application No. 2008-252795.

*Primary Examiner* — David Bryant
*Assistant Examiner* — Christopher M Koehler
(74) *Attorney, Agent, or Firm* — Sughrue Mion, PLLC

(57) ABSTRACT

Provided is a method of removing a cartridge, that is to be removed, that is housed in a deep side of a cell and stuck on a wall surface of the cell without increasing the number of components. In order to remove the cartridge stuck on the wall surface of the cell, the method includes a pressing step and a releasing step. In the pressing step, a picker mechanism is abutted on a latch lever, and then moved so as to move the latch lever from an engaged position to a released position. This presses the latch lever to increase the urging force of the urging unit. In the releasing step, after the pressing step, the picker mechanism is moved away from the cell to release the urging force of the latch lever spring.

4 Claims, 13 Drawing Sheets

(56) References Cited

U.S. PATENT DOCUMENTS

| | | | |
|---|---|---|---|
| 6,396,658 B1* | 5/2002 | Iwabuchi | 360/92.1 |
| 7,839,601 B2* | 11/2010 | Nave et al. | 360/92.1 |
| 8,134,799 B1* | 3/2012 | Ostwald et al. | 360/92.1 |
| 8,254,053 B2* | 8/2012 | Tateno et al. | 360/92.1 |
| 8,254,217 B2* | 8/2012 | Kawasaki | 369/30.34 |
| 8,582,401 B2* | 11/2013 | Kawasaki et al. | 369/30.48 |
| 2002/0085458 A1* | 7/2002 | Luffel et al. | 369/30.43 |
| 2004/0012878 A1* | 1/2004 | Yamakawa et al. | 360/92 |
| 2005/0162774 A1* | 7/2005 | Yoshida | 360/92 |
| 2005/0162775 A1* | 7/2005 | Ojima et al. | 360/92 |
| 2005/0163022 A1* | 7/2005 | Kawasaki | 369/178.01 |
| 2007/0147192 A1 | 6/2007 | Steinhilber et al. | |
| 2007/0230036 A1* | 10/2007 | Nave et al. | 360/92 |
| 2008/0231988 A1* | 9/2008 | Nave et al. | 360/92.1 |
| 2009/0238055 A1* | 9/2009 | Kawasaki | 369/75.11 |
| 2010/0200524 A1* | 8/2010 | Suzuki et al. | 211/26 |
| 2010/0254039 A1* | 10/2010 | Kawasaki et al. | 360/92.1 |

FOREIGN PATENT DOCUMENTS

| | | |
|---|---|---|
| JP | 58-48013 U | 3/1983 |
| JP | 61-14584 B2 | 4/1986 |
| JP | 64-46253 A | 2/1989 |
| JP | 3-130032 U | 12/1991 |
| JP | 05-109166 A | 4/1993 |
| JP | 5-120776 A | 5/1993 |
| JP | 08-161871 A | 6/1996 |
| JP | 2005-209278 A | 8/2005 |

\* cited by examiner

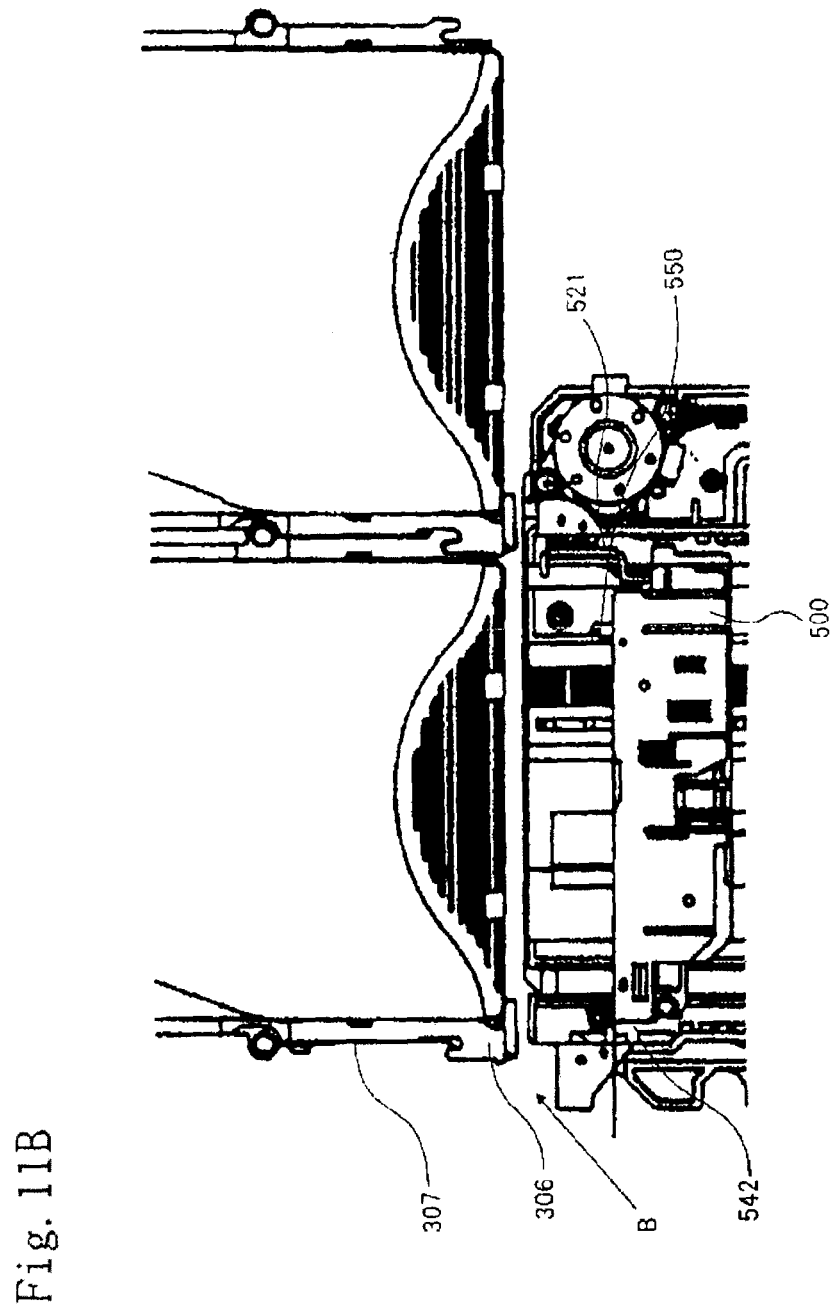

METHOD OF REMOVING A CARTRIDGE

CROSS REFERENCE TO RELATED APPLICATIONS

This application is a national stage entry of international application PCT/JP/2009/064646, filed on Aug. 21, 2009, which is based upon and claims the benefit of priority from Japanese patent application No. 2008-252795, filed on Sep. 30, 2008, the disclosure of which is incorporated herein in its entirety by reference.

BACKGROUND ON THE INVENTION

1. Technical Field

The present invention relates to a method of removing a cartridge in a library device that stores a plurality of cartridges such as magnetic tapes, magnetic disks, optical disks, or magneto-optical disks, selectively removes a desired cartridge from among those cartridges, and reads or writes data by using internal drive.

2. Background Art

As discussed in JP2005-209278A (hereinafter, Patent Document 1), there is known a library device (may also be referred to as a data storage system) that stores cartridges in a plurality of cells of a magazine, selectively removes a desired cartridge among those cartridges, and reads or writes data by using a drive.

FIG. 1A is a plan view showing a library device related to the present invention. FIG. 1B is a front view showing the library device related to the present invention. FIG. 2 is an appearance perspective view showing an example of the library device related to the present invention.

As shown in FIG. 1A and FIG. 2, the library device related to the present invention includes magazine 1200, two drives 1600, and accessor mechanism 1400. Magazine 1200 includes a plurality of cells 1300 for housing cartridges 1100 stacked in a horizontal posture. Drive 1600 reads or writes data on a storage medium in cartridge 1100. Accessor mechanism 1400 transfers cartridge 1100.

Each one of cells 1300 used in the library device can house a plurality of cells in a row.

However, in the case of the cell that can house the plurality of cartridges, due to an assembling error or aged deterioration of the cell or the cartridges, a cartridge housed in a deep side of the cell may be caught on a wall surface of the cell. As a result, the cartridge cannot be removed from the cell.

In anticipation of such an emergency, the library device can include a mechanism for ejecting the cartridge from the cell by, for example, thrusting out the cartridge. During a normal operation, however, the cartridge housed in the deep side of the cell is not caught on the wall surface of the cell. Thus, the addition of the ejection mechanism just for such an emergency is wasteful, and an increase in the number of components creates a problem of a cost increase.

CONVENTIONAL ART DOCUMENT

Patent Document

Patent Document 1: JP2005-209278A

BRIEF SUMMARY OF THE INVENTION

An object of the present invention is to provide a method of removing a cartridge, in which a cartridge can be removed without increasing the number of components, a cartridge housed in a deep side of a cell and stuck to a wall surface of the cell.

In order to achieve the object, the present invention provides a method of removing a cartridge in a library device. The library device includes: a cell that houses a plurality of cartridges in a row along a wall surface parallel to an insertion/ejection direction of the cartridges; a picker mechanism that moves away from the cell to remove the cartridges from the cell; a latch lever provided in the wall surface of the cell to be swingable between an engaged position for holding the cartridges in the cell by engaging with the cartridges and a released position where the engagement with the cartridges is released; and an urging unit that urges the latch lever from the released position to the engaged position. The method according to the present invention includes: a pressing step of pressing, by moving the picker mechanism to move the latch lever from the engaged position to the released position after the picker mechanism has abutted on the latch lever, the latch lever to increase an urging force of the urging unit; and a releasing step of releasing, after the pressing step, the urging force of the urging unit by moving the picker mechanism away from the cell.

According to the present invention, without increasing the number of components, the cartridge housed in the deep side of the cell and stuck on the wall surface of the cell can be removed.

BRIEF DESCRIPTION OF THE DRAWINGS

FIG. 11B is an enlarged view showing a main portion of FIG. 10D.

DETAILED DESCRIPTION OF THE INVENTION

Figure 1A:
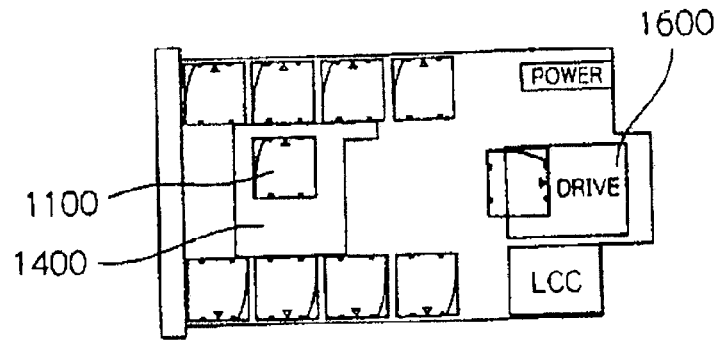
FIG. 1A is a plan view showing a library device related to the present invention.
Figure 1B:
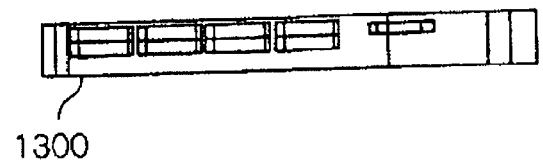
FIG. 1B is a front view showing the library device related to the present invention.
Figure 2:
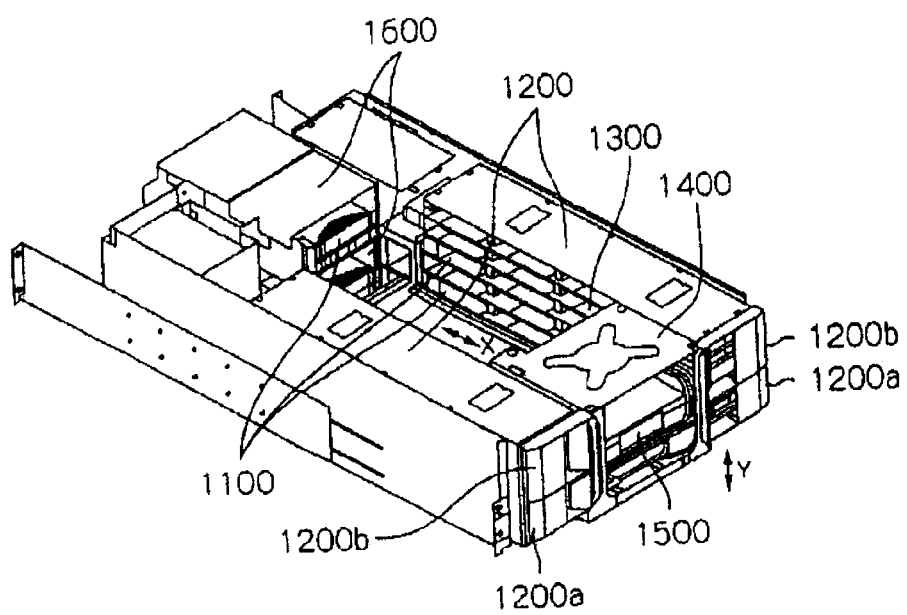
FIG. 2 is an appearance perspective view showing an example of the library device elated to the present invention.

Best Mode for Carrying out the Invention

Next, an embodiment of the present invention is described referring to the drawings.

Figure 3A:
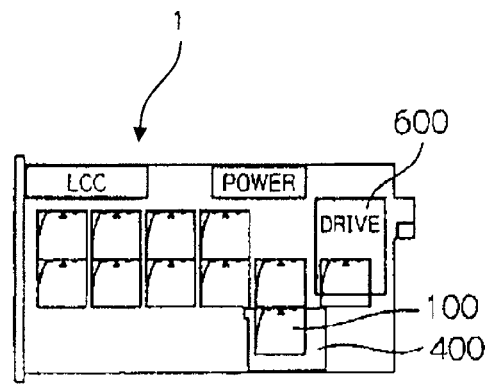
FIG. 3A is a plan view showing a library device according to an exemplary embodiment of the present invention.
Figure 3B:
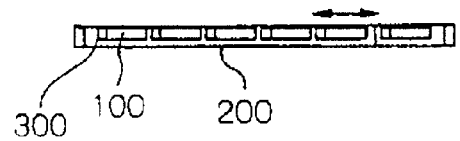
FIG. 3B is a front view showing the library device according to the exemplary embodiment of the present invention.
Figure 4:
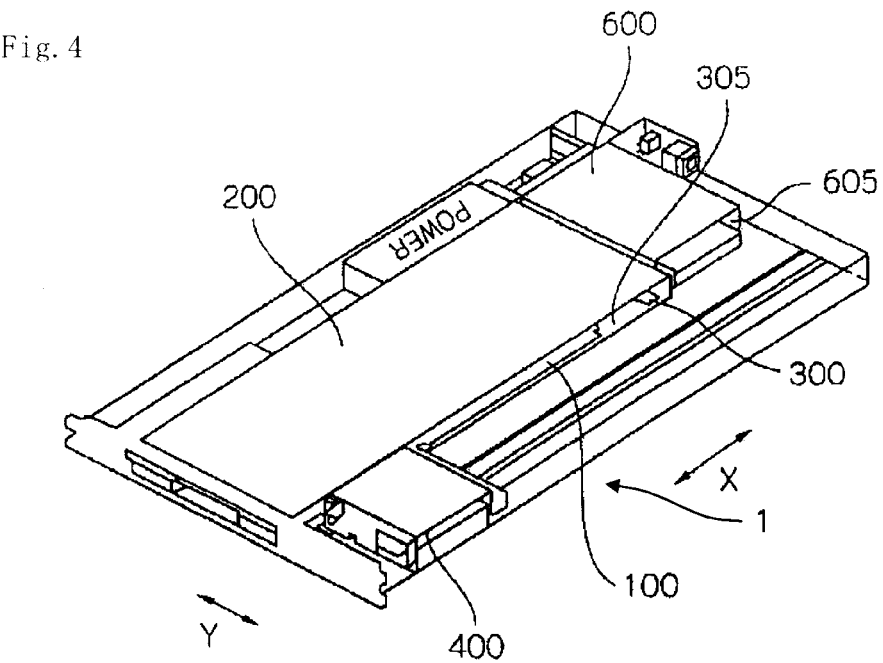
FIG. 4 is an appearance perspective view showing the library device according to the exemplary embodiment of the present invention.
Figure 5:
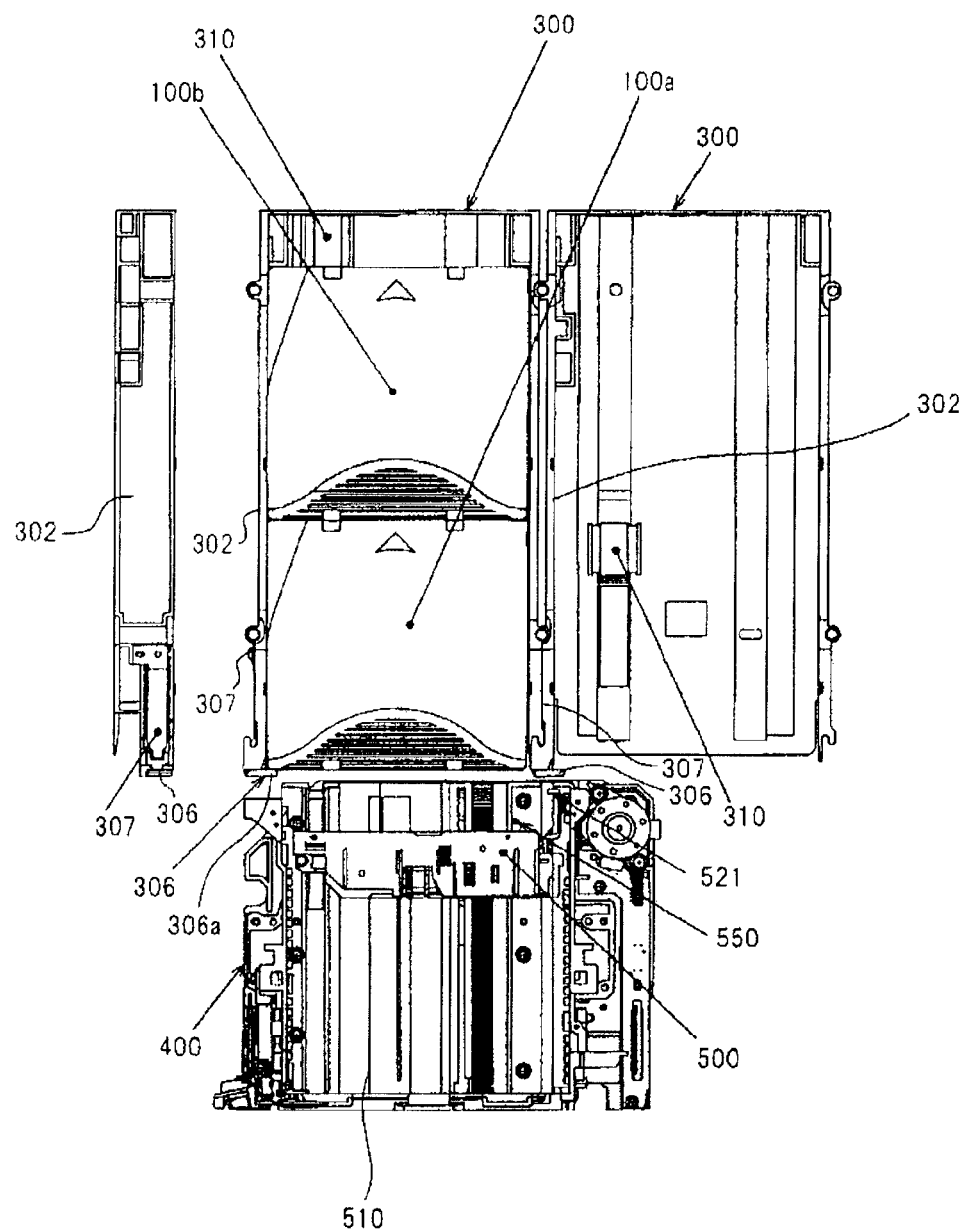
FIG. 5 is a plan view showing an accessor mechanism, and a plan view and a side view of a cell.
Figure 6:
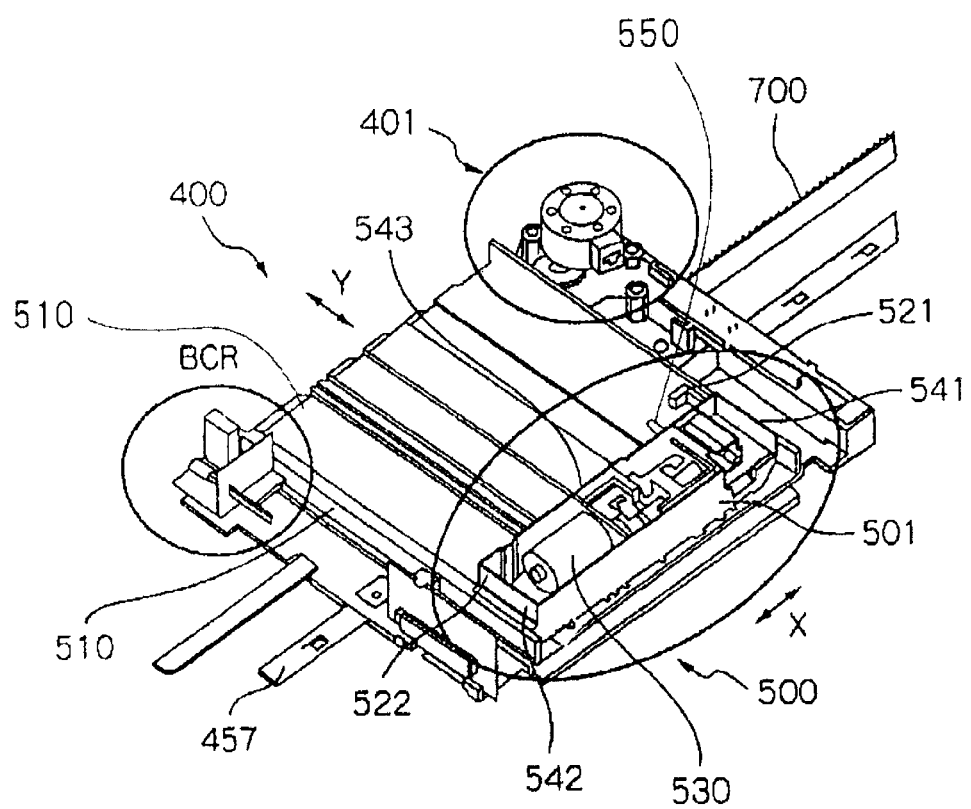
FIG. 6 is a perspective view showing the accessor mechanism.
Figure 7:
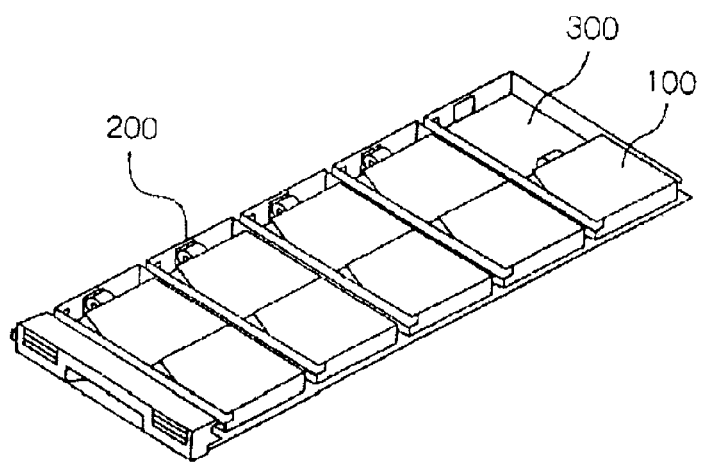
FIG. 7 is an appearance perspective view showing an example of a magazine.
Figure 8A:
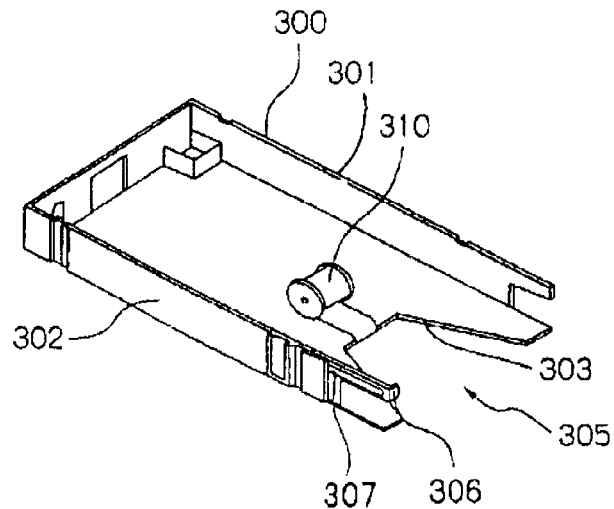
FIG. 8A is an explanatory perspective view showing a basic mechanism of a deep cell in a state where no cartridge is housed in the deep cell.
Figure 8B:
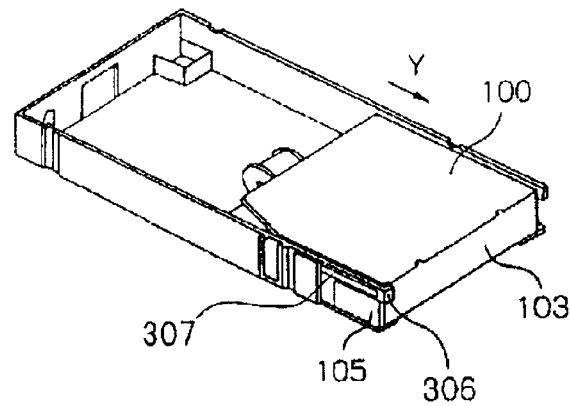
FIG. 8B is an explanatory perspective view showing the basic mechanism of the deep cell in a state where one cartridge is housed in the deep cell.
Figure 8C:
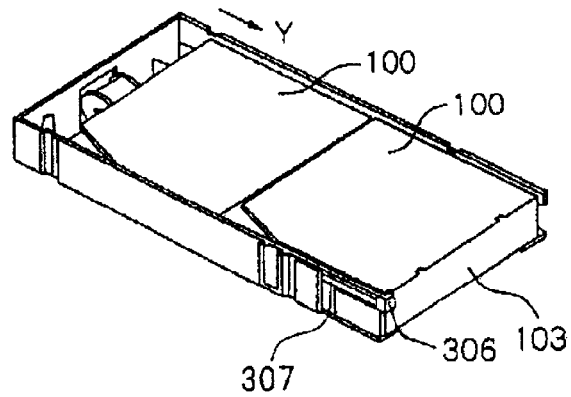
FIG. 8C is an explanatory perspective view showing the basic mechanism of the deep cell in a state where two cartridges are housed in the deep cell.
Figure 9:
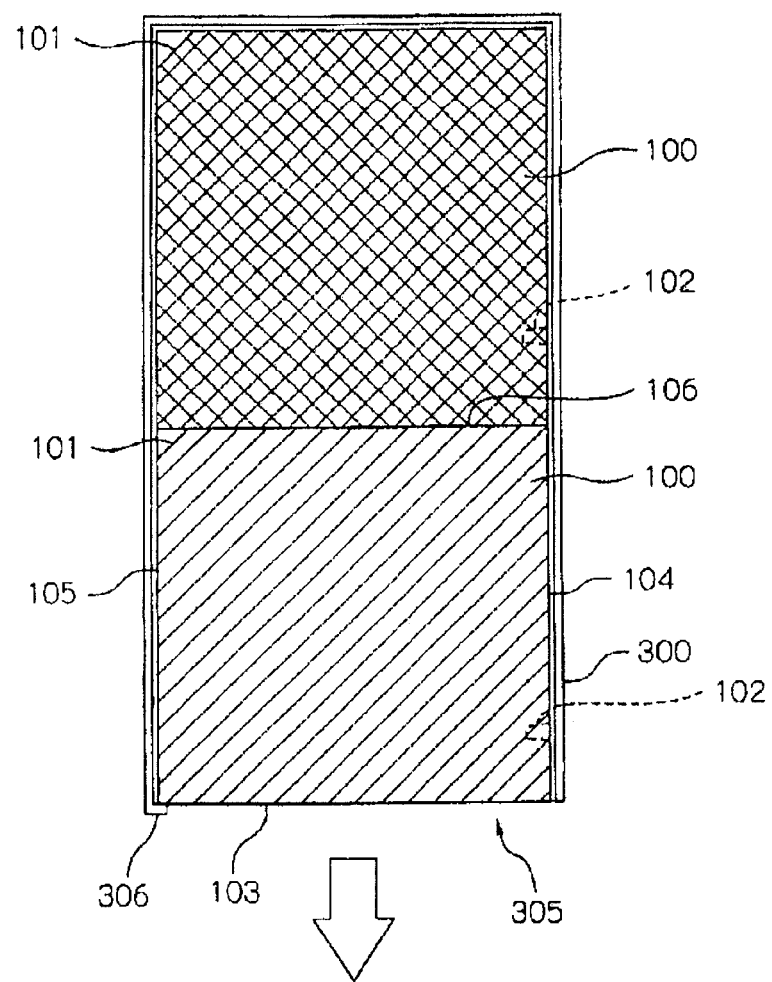
FIG. 9 is a schematic plan view showing a cell and a cartridge used in the library device according to the present invention.

FIG. 3A is a plan view showing a library device according to an exemplary embodiment. FIG. 3B is a front view showing the library device according to the exemplary embodiment. FIG. 4 is an appearance perspective view showing the library device according to the exemplary embodiment. FIG. 5 is a plan view showing an accessor mechanism, and a plan view and a side view of a cell. FIG. 6 is a perspective view showing a configuration of the accessor mechanism. FIG. 7 is an appearance perspective view showing a magazine. FIGS. 8A to 8C are explanatory perspective views showing a mechanism of the cell. FIG. 9 is a schematic plan view showing a cell and a cartridge used in the library device according to the exemplary embodiment.

The library device according to the exemplary embodiment includes magazine 200, drive 600, and accessor mechanism 400. Magazine 200 includes a plurality of cells 300 for housing cartridges 100. Drive 600 reads or writes data on a recording medium in cartridge 100. Accessor mechanism 400 transfers cartridge 100.

According to the exemplary embodiment, one magazine 200 and drive 600 are arranged adjacently to each other, and opening 305 of cell 300 housed in magazine 200 and opening 605 of drive 600 are set in the same direction.

(Accessor Mechanism)

Accessor mechanism 400 is configured to be reciprocated by drive unit 401, and includes picker frame 510. Picker frame 510 includes picker mechanism 500 movable in a Y direction.

Drive unit 401 includes a motor and a driver gear train. A final gear of the drive gear train is engaged with rack 700 extended in an X direction. When the motor of drive unit 401 is driven to rotate reversely, accessor mechanism 400 reciprocates, by its driving force, on guide rail 457 in the X direction. A moving mechanism of accessor mechanism 400 in the X direction can include a combination of a well-known timing belt and a pulley as long as accurate positioning can be performed.

According to the exemplary embodiment, accessor mechanism 400 moves only in a horizontal direction. However, when magazine 200 is stacked to form a multistage magazine, a mechanism to enable a vertical movement is provided.

(Picker Mechanism)

Picker mechanism 500 holds cartridge 100, and inserts or ejects cartridge 100 into or from magazine 200, cell 300, or drive 600. Accessor mechanism 400 including picker mechanism 500 can transfer, by such an operation, cartridge 100 between cell 300 and drive 600, between cells 300, or between drives 600.

Picker mechanism 500 includes box-shaped main body 501. Box-shaped main body 501 includes front face 543, first side face 541, second side face 542 located oppositely to first side face 541, and a rear face.

Picker arm 521 is provided in first side face 541 of a direction that intersects a horizontal-moving direction of accessor mechanism 400. Picker arm 521 is formed into a shape that extends from first side face 541 to front face 543, and has its leading edge bent toward second side face 542 beyond front face 543.

Second side face 542 functions, as described below, as ejection-time releasing unit 522 to push open latch lever 306 of cell 300. According to the exemplary embodiment, second side face 542 is used as ejection-time releasing unit 522. However, ejection-time releasing unit 522 can be separately provided on second side face 542 side.

Picker mechanism 500 houses picker drive motor 530 in main body 501. Picker drive motor 530 drives picker mechanism 500 in picker frame 510 in the Y direction.

Sensor shaft 550 extended from main body 501 is provided in front face 543. Sensor shaft 550 is a sensor for detecting whether cartridge 100 in cell 300 is in a predetermined position to be removed by picker mechanism 500. Sensor shaft 550 abuts, when picker mechanism 500 moves to a position to remove cartridge 100, on cartridge 100 that is to be pushed into main body 501, thereby detecting that cartridge 100 is in the predetermined position. On the other hand, when sensor shaft 550 is not pushed in even after picker mechanism 500 has moved to the position to remove cartridge 100, sensor shaft 550 detects that cartridge 100 is not in the predetermined position.

(Cell)

Cell 300 is a deep cell that can house two cartridges 100 in a longitudinal direction. As shown in FIG. 8A, cell 300 includes, on bottom surface 303, constant force spring 310 for urging cartridge 100 to opening 305 side.

Cell 300 includes latch lever 306 and latch lever spring 307 on opening 305 side of second side wall 302 located oppositely to first side wall 301. First side wall 301 and second side wall 302 are provided in parallel to an insertion/ejection direction of cartridge 100. Latch lever 306 is provided to be swingable, by engaging with cartridge 100, between an engaged position B (see FIG. 11B) for holding cartridge 100 in cell 300 and a released position A (see FIG. 11A) where latch lever 306 is disengaged from cartridge 100. Latch lever 306 and second side wall 302 are integrally provided. However, these components can be separately provided. Latch lever 306 includes an engaging portion bent to opening 305 side in its leading edge formed by partially notching the latch lever. Latch lever 306 engages with second side face 105 side of rear surface 103 of cartridge 100 to prevent cartridge 100 from unintentionally moving out from cell 300.

Latch lever spring 307 is an urging unit that urges latch lever 306 from the released position A to the engaged position B. The exemplary embodiment shows the configuration where latch lever 306 and latch lever spring 307 are separately provided. However, the present invention is not limited to this configuration. As long as latch lever 306 has sufficient elasticity, the elasticity of latch lever 306 itself can be used as an urging unit.

Constant force spring 310 is a thin plate closely wound based on a fixed curvature and is used by linearly extending its outer end. Constant force spring 310 has characteristics in which a force is almost constant irrespective of strokes. In both of the case where one cartridge cell 100 is housed in cell 300 as shown in FIG. 8B and the case where two cartridges 100 are housed in cartridge 100 as shown in FIG. 8C, constant force spring 310 applies almost equal forces to cartridges 100. The unit that urges cartridge 100 to opening 305 side is not limited to constant force spring 310. A normal coil spring can be used. In the case of the coil spring, the longer the stroke the larger the force.

(Cartridge)

Cartridge 100 is a recording medium for reading or writing data shared by computers (not shown) connected to the library device via a communication line such as a local area network (LAN) or Internet. As such a recording medium, for example, there are a tape medium such as linear tape open (LTO) or digital linear tape (DLT), and a disk medium such as a digital video disc (DVD), a magneto-optical disk (MO), or a magnetic disk (MD) housed in a housing.

As shown in FIG. 9, cartridge 100 according to the exemplary embodiment includes engaging hole 102 formed in first side face 104 near rear surface 103. Tapered surface 101 is formed at a corner between second side face 105 and front face 106. Second side face 105 is formed oppositely to first side face 104. Engaging hole 102 is engaged with picker arm 521. Tapered surface 101 is a slope provided to expand latch lever 306 when cartridge 100 is inserted into cell 300. First side face 104 and second side face 105 constitute surfaces parallel to an insertion direction into cell 300. In tapered surface 101, a part of a target surface is tapered.

According to the exemplary embodiment, tapered surface 101 is formed at the corner between second side face 105 and front face 106. However, depending on the position of latch lever 306, tapered surface 101 can be formed at a corner between a surface parallel to the insertion direction into cell 300, other than second side face 105, and front face 106.

(Drive)

Drive 600 is a read/write device that reads data written in cartridge 100 loaded on drive 600, and writes data updated by an operator of a computer in cartridge 100.

Next, referring to FIGS. 10A to 10G, an operation of removing cartridge 100 in the library device is described. The removal operation described below is an example where even when the user tries to remove cartridge 100, the user fails because cartridge 100 is not in a predetermined position, and thus the user tries to remove cartridge 100 again. Hereinafter, the operation of removing the cartridge again may be referred to as a retry operation.

(1) Operation of Removing Cartridge from Cell

FIGS. 10A to 10G show the operation of removing cartridge 100 housed in cell 300 of magazine 200. FIG. 11A is an enlarged view showing the main portion of FIG. 10C. FIG. 11B is an enlarged view showing the main portion of FIG. 10D.

In the drawings, in the Y direction, $Y_1$ indicates a direction where picker mechanism 500 approaches cell 300, and $Y_2$ indicates a direction where picker mechanism 500 moves away from cell 300. $X_1$ indicates a direction where accessor mechanism 400 moves from first side face 104 side of cartridge 100 to second side face 105 side including latch lever 306, and $X_2$ indicates a direction where accessor mechanism 400 moves in an opposite direction. In FIGS. 10A to 10G, two cells 300a and 300b arrayed in parallel respectively house one each cartridges 100a and 100b. In a state shown in FIG. 10A, cartridge 100b in cell 300b is in a predetermined position to be removed by picker mechanism 500. On the other hand, cartridge 100a in cell 300a is stuck to second side wall 302 in a deep position of cell 300a. As a result, cartridge 100a is not in the predetermined position to be removed by picker mechanism 500. It is assumed that cartridge 100a is stuck because of the frictional force between cartridge 100a and second side wall 302. However, even in a state where cartridge 100a is stuck because of the frictional force between cartridge 100a and any one of wall surfaces constituting cell 300a, a retry operation described below is performed.

Hereinafter, the retry operation of removing cartridge 100a from cell 300a is described.

Figure 10A:
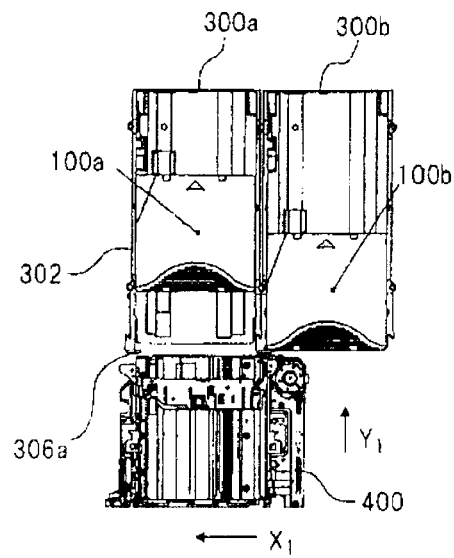
FIG. 10A is a view for explaining an operating of removing a cartridge from the cell in the library device according to the present invention, and shows a state in which the accessor mechanism is arranged in a position facing the cartridge that is to be removed from the cell.
Figure 11A:
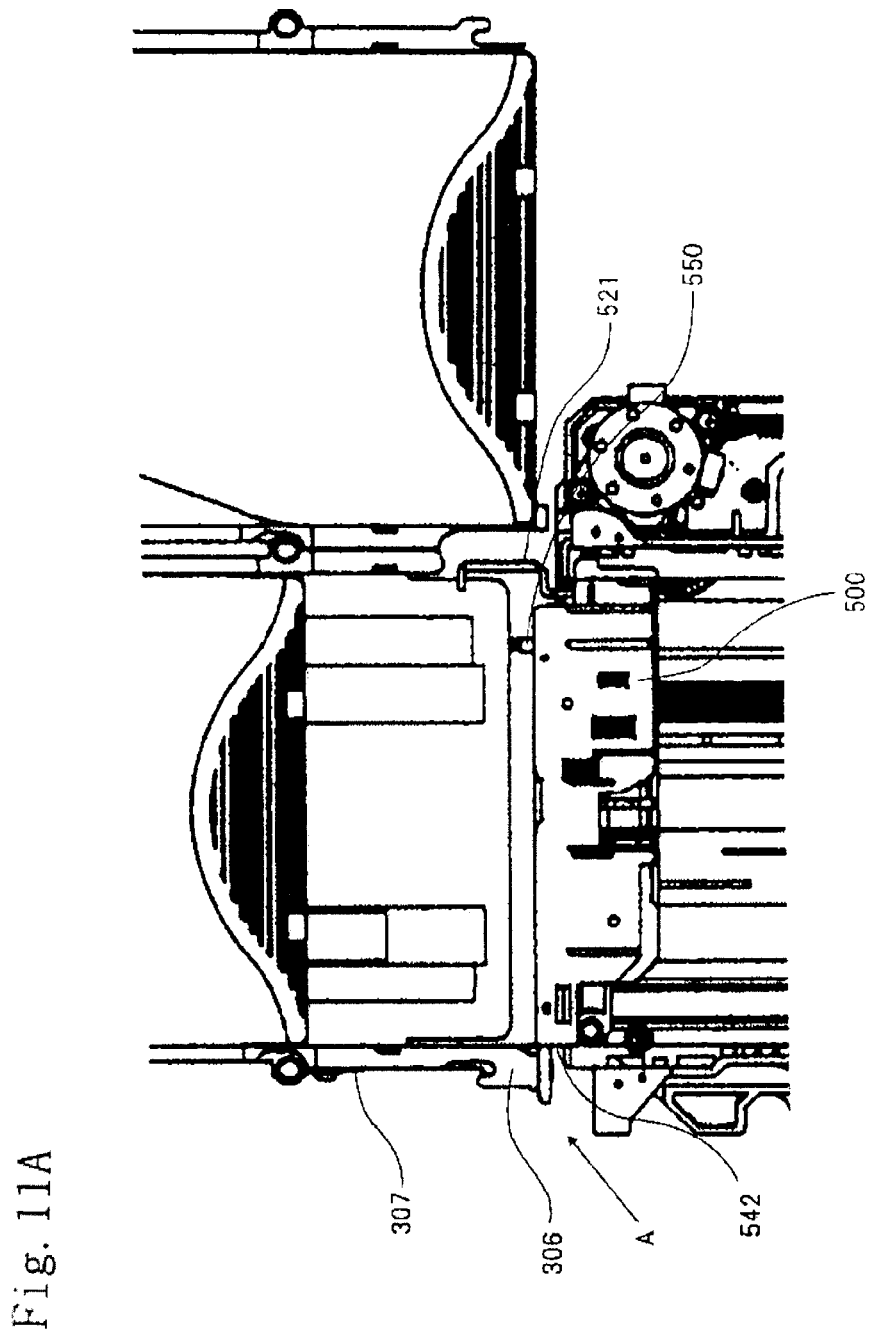
FIG. 11A is an enlarged view showing a main portion of FIG. 10C.

As shown in FIG. 10A, in order to remove cartridge 100a from cell 300a, first, accessor mechanism 400 is moved to dispose the opening of picker frame 510 in a position facing cartridge 100a that is to be removed from cell 300a.

At this time, picker arm 521 of picker mechanism 500 is housed in picker frame 510. In the state shown in FIG. 10A, picker mechanism 500 is arranged in a position where no collision occurs between end 306a of latch lever 306 and second side face 542 of picker mechanism 500 in picker frame 510 even when picker mechanism 500 moves in the $Y_1$ direction. In this position, even when picker mechanism 500 moves in the $Y_1$ direction, picker arm 521 does not collide with cartridge 100.

Figure 10B:
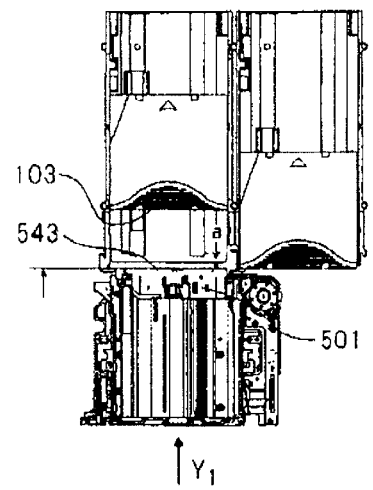
FIG. 10B is a view for explaining the operation of removing the cartridge from the cell in the library device according to the present invention, and shows a state of detecting whether the cartridge is in a predetermined position to be removed.

As shown in FIG. 10B, picker mechanism 500 is then moved toward cell 300 ($Y_1$ direction). Normally, picker mechanism 500 is stopped in a position where front face 543 of main body 501 of picker mechanism 500 abuts on rear surface 103 of cartridge 100a. However, even when cartridge 100a is moved to the position at which the cartridge is to be removed, rear surface 103 of cartridge 100a has not reached opening 305 of cell 300. Thus, there is distance a between sensor shaft 550 of picker mechanism 500 and rear surface 103 of cartridge 100a. In other words, sensor shaft 550 detects that cartridge 100a is not in a predetermined position at which the cartridge is to be remove.

Thus, the retry operation is performed.

Figure 10C:
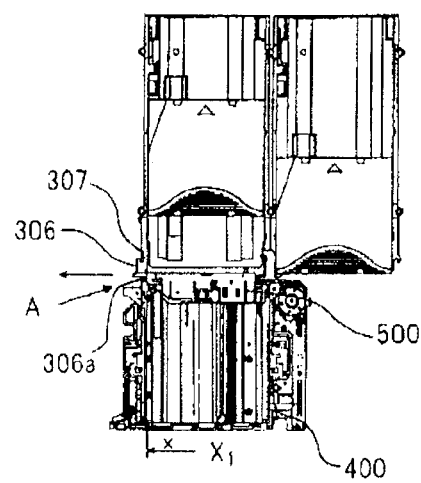
FIG. 10C is a view for explaining the operation of removing the cartridge from the cell in the library device according to the present invention, and shows a state of implementing a pressing step.

As shown in FIG. 10C or FIG. 11A, accessor mechanism 400 is moved toward latch lever 306 ($X_1$ direction). By the movement of accessor mechanism 400 in the X1 direction, second side face 542 of picker mechanism 500 expands latch lever 306 in an opening direction to retract the latch lever. In other words, end 306a of latch lever 306 moves from the engaged position B to the released position A where latch lever 306 is disengaged from cartridge 100a. An urging force of latch lever spring 307 for urging latch lever 306 from the released position A to the engaged position B is accordingly increased. A step shown in FIG. 10C is a pressing step.

Figure 10D:
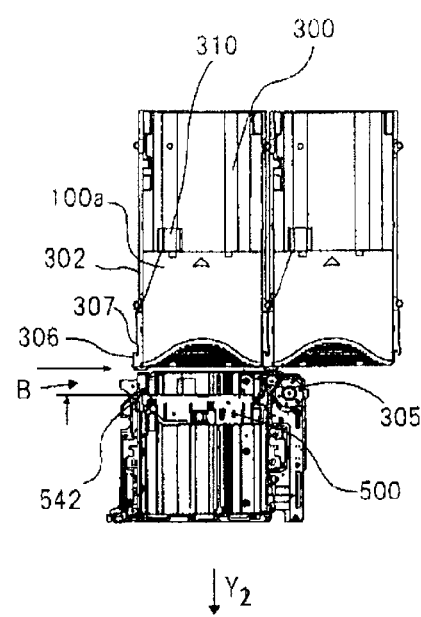
FIG. 10D is a view for explaining the operation of removing the cartridge from the cell in the library device according to the present invention, and shows a state of implementing a releasing step.

As shown in FIG. 10D or FIG. 11B, in this state, picker mechanism 500 is then retracted in the $Y_2$ direction. Specifically, pressing of side face 542 of picker mechanism 500 to end 306a of latch lever 306 is suddenly released. This sudden releasing of the pressing instantaneously releases the urging force of latch lever spring 307 that is increased by the press-retraction. A step shown in FIG. 10D is a releasing step. The instantaneous releasing of the urging force causes wild swinging of latch lever 306 between the released position A and the engaged position B. This swing is transmitted to second side wall 302 of cell 300a. The vibration transmitted to second side wall 302 reaches a portion of second side wall 302 on which cartridge 100a is stuck due to friction. The vibration of the wall causes cartridge 100 to swing and this vibration causes the cartridge to be released from its stuck state in the wall. Cartridge 100a released from the stuck state caused by the friction is urged by constant force spring 310 to move to opening 305 of cell 300.

The pressing step and the releasing step performed only once may not be enough to move cartridge 100a to the predetermined position where it will be removed. In such a case, the pressing step and the releasing step can alternately be repeated.

When the pressing step and the releasing step are alternately repeated, in the pressing step, the amount in which accessor mechanism 400 moves in the X1 direction, i.e., the amount in which latch lever 306 is pushed open by picker mechanism 500, can be larger in proportion to the number or times that the pressing step and the releasing step are repeated. In other words, the amount in which latch lever 306 is pushed open is caused to be small, an increase in urging force of latch lever spring 307 is set small, and small vibration is applied to cell 300. Then, the vibration applied to cell 300 is gradually increased. If performing such control enables movement of cartridge 100a to the predetermined position by vibration that is generated by a small urging force, an impact force applied to latch lever 306 or cell 300 can be limited. Thus, an advantage can be provided for product durability.

Figure 10E:
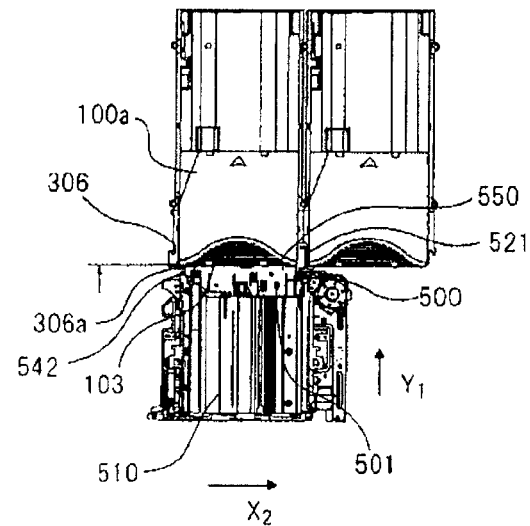
FIG. 10E is a view for explaining the operation of removing the cartridge from the cell in the library device according to the present invention, and shows a state where the accessor mechanism is moved toward a latch lever.

As shown in FIG. 10E, picker mechanism 500 is then moved in the $Y_1$ direction. Sensor shaft 550 of picker mechanism 500 is pressed to rear surface 103 of cartridge 100a to retract into main body 501, thereby detecting that cartridge 100a is in the predetermined position to be removed. In this case, in picker frame 510, picker mechanism 500 is arranged in a position where no collision occurs between end 306a of latch lever 306 and side face 542 of picker mechanism 500 even when picker mechanism 500 moves in the $Y_1$ direction. In this position, even when picker mechanism 500 moves in the $Y_1$ direction, picker arm 521 does not collide with cartridge 100.

Figure 10F:
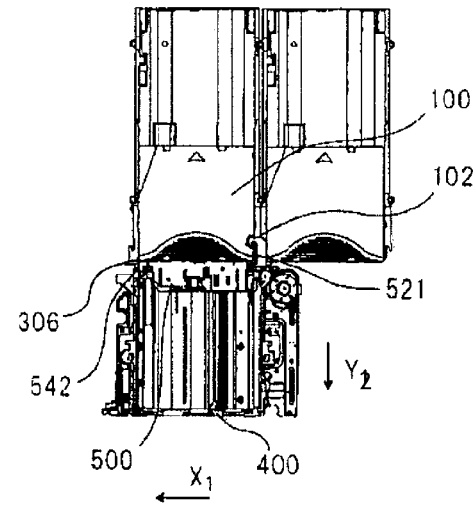
FIG. 10F is a view for explaining the operation of removing the cartridge from the cell in the library device according to the present invention, and shows a state where the cartridge is started to be pulled out from the cell.

As shown in FIG. 10F, accessor mechanism 400 is then moved toward latch lever 306 ($X_1$ direction). By the movement of accessor mechanism 400 in the $X_1$ direction, second side face 542 of picker mechanism 500 expands lath lever 306 in the opening direction to retract. Engagement by latch lever 306 is accordingly released, and the leading edge of picker arm 521 simultaneously fits in engaging hole 102 of cartridge 100a that is to be engaged. In other words, in the library device according to the exemplary embodiment, the engaging direction of picker arm 521 and the releasing direction of latch lever 306 are the identical $X_1$ direction, and the $X_1$ direction is one of the moving directions of accessor mechanism 400. Thus, in the library device according to the embodiment, by one behavior, i.e., movement of accessor mechanism 400 in the $X_1$ direction, engaging of picker arm 521 and releasing of latch lever 306 are simultaneously performed.

Figure 10G:
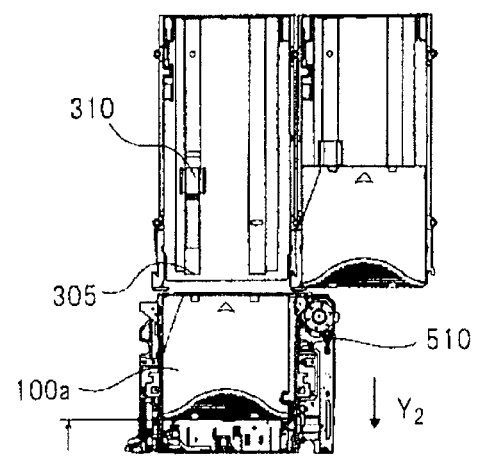
FIG. 10G is a view for explaining the operation of removing the cartridge from the cell in the library device according to the present invention, and shows a state where the cartridge has been pulled out from the cell.

As shown in FIG. 10G, by moving picker arm 500 in the $Y_2$ direction in the released state of the engagement by latch lever 306, picker arm 521 pulls out cartridge 100a from cell 300a.

According to the exemplary embodiment, cartridge 100a is urged toward opening 305 ($Y_2$ direction) by constant force spring 310. Thus, only a small driving force is necessary for pulling out cartridge 100a from cell 300.

The housing of cartridge 100a from cell 300a in picker frame 510 completes the removal operation of cartridge 100. After cartridge 100a has been completely pulled out from cell 300a, latch lever 306 returns to the original position from the retraction position.

As descried above, according to the exemplary embodiment, performing the retry operation enables movement of the cartridge that is present in a position where the cartridge cannot be removed it is stuck in cell 300 due to friction that is exerted on the position at which the cartridge is to be removed without adding any removal device or component.

While the present invention has been described with reference to the embodiment, it is to be understood that the invention is not limited to the embodiment. Various changes understandable to those skilled in the art can be made in shape and details of the present invention within the scope of technical teachings of the invention.

This application is based upon and claims the benefit of priority from Japanese patent application No. 2008-252795, filed on Sep. 30, 2008, the disclosure of which is incorporated herein in its entirety by reference.

EXPLANATION OF REFERENCE NUMERALS 100, 100a, 100b cartridge
101 tapered surface
102 engaging hole
103 rear surface
104 first side face
105 second side face
106 front face
200 magazine
300, 300a, 300b cell
301 first side face
302 second side face
303 bottom surface
305 opening
306 latch lever
306a end
307 latch lever spring
310 constant force spring
400 accessor mechanism
401 drive
457 guide rail
500 picker mechanism
501 main body
510 picker frame
521 picker arm
522 ejection-time releasing unit
530 picker drive motor
541 first side face
542 second side face
543 front face
550 sensor shaft
A released position
B engaged position

The invention claimed is:
1. A method of removing a cartridge in a library device, the library device comprising:
 a cell that houses a plurality of cartridges in a row parallel to an ejection direction of each of the plurality of cartridges;
 a picker mechanism movable in a first direction, which is the ejection direction, a second direction opposite the first direction, a third direction perpendicular to the first direction, and a fourth direction opposite the third direction;

a first urging unit that urges an outermost cartridge of the plurality of cartridges toward a predetermined position;

a latch lever provided in the wall surface of the cell movable between an engaged position and a released position; and a second urging unit that urges the latch lever into the engaged position, the method comprising:

a pressing step of the picker mechanism applying pressing force in the third direction against an urging force of the second urging unit, by pressing the picker mechanism against an abutting surface of the latch lever which faces the fourth direction; and a releasing step of releasing, after the pressing step, the urging force of the second urging unit by moving the picker mechanism in the first direction and separating the picker mechanism from the abutting surface, wherein during the releasing step, the picker mechanism moves so that a surface of the picker mechanism facing the third direction moves along the abutting surface of the latch lever until a surface of the picker mechanism facing the second direction passes a surface of the latch lever facing the first direction.

2. The method according to claim 1, wherein when a sensor that detects whether the outermost cartridge is situated at the predetermined position in the cell detects that the outermost cartridge is not situated at the predetermined position, the pressing step and the releasing step are executed.

3. The method according to claim 2, wherein the pressing step and the releasing step are alternately repeated until the sensor detects that the outermost cartridge is situated at the predetermined position.

4. The method of according to claim 3, wherein a distance by which the picker mechanism moves to move presses the latch lever in the third direction in the pressing step is increased each time that the pressing step is repeated.

* * * * *

UNITED STATES PATENT AND TRADEMARK OFFICE
CERTIFICATE OF CORRECTION

PATENT NO. : 8,869,368 B2
APPLICATION NO. : 13/056018
DATED : October 28, 2014
INVENTOR(S) : Suzuki et al.

Page 1 of 1

It is certified that error appears in the above-identified patent and that said Letters Patent is hereby corrected as shown below:

In the claim

Column 10, Line 15: Claim 4, delete "moves to move presses" and insert -- presses --

Signed and Sealed this
Twenty-fourth Day of March, 2015

Michelle K. Lee
*Director of the United States Patent and Trademark Office*